(12) United States Patent
Zheng et al.

(10) Patent No.: US 10,783,354 B2
(45) Date of Patent: Sep. 22, 2020

(54) FACIAL IMAGE PROCESSING METHOD AND APPARATUS, AND STORAGE MEDIUM

(71) Applicant: TENCENT TECHNOLOGY (SHENZHEN) COMPANY LIMITED, Shenzhen (CN)

(72) Inventors: Zhaoting Zheng, Shenzhen (CN); Xuan Qiu, Shenzhen (CN); Yunsheng Wu, Shenzhen (CN); Bin Fu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 174 days.

(21) Appl. No.: 15/952,546

(22) Filed: Apr. 13, 2018

(65) Prior Publication Data
US 2018/0232561 A1 Aug. 16, 2018

Related U.S. Application Data

(63) Continuation of application No. PCT/CN2017/082776, filed on May 2, 2017.

(30) Foreign Application Priority Data

May 4, 2016 (CN) .......................... 2016 1 0293280

(51) Int. Cl.
G06K 9/00 (2006.01)
G06K 9/46 (2006.01)

(52) U.S. Cl.
CPC ....... G06K 9/00281 (2013.01); G06K 9/0061 (2013.01); G06K 9/00302 (2013.01);
(Continued)

(58) Field of Classification Search
CPC ........... G06K 9/00221; G06K 9/00228; G06K 9/00234; G06K 9/00248; G06K 9/00261;
(Continued)

(56) References Cited

U.S. PATENT DOCUMENTS

2006/0115157 A1* 6/2006 Mori .................. G06K 9/00221
382/190
2008/0201144 A1 8/2008 Song et al.
(Continued)

FOREIGN PATENT DOCUMENTS

CN 101609475 12/2009
CN 103369214 10/2013
(Continued)

OTHER PUBLICATIONS

International Search Report dated Jul. 20, 2017 in PCT/CN2017/082776 filed May 2, 2017. (With English Translation).
(Continued)

Primary Examiner — Dwayne D Bost
Assistant Examiner — Stephen M Brinich
(74) Attorney, Agent, or Firm — Oblon, McClelland, Maier & Neustadt, L.L.P.

(57) ABSTRACT

A method for image processing, an apparatus having a processing circuitry and non-transitory computer readable medium are described. For example, the processing circuitry extracts, from a first image of a face, first values of feature points of a facial organ on the face. The feature points of the facial organ are indicative of characteristics of the facial organ. Then, the processing circuitry calculates first distances between the feature points of the facial organ based on the first values of the feature points. Further, the processing circuitry calculates feature parameters of the facial organ according to the first distances between the feature points. Then, the processing circuitry detects a facial action
(Continued)

of the face when the feature parameters satisfy a preset condition associated with the facial action.

20 Claims, 9 Drawing Sheets

(52) U.S. Cl.
CPC ......... *G06K 9/4604* (2013.01); *G06K 9/4652* (2013.01); *G06K 9/4671* (2013.01)

(58) Field of Classification Search
CPC ........... G06K 9/00268; G06K 9/00275; G06K 9/00281; G06K 9/00288; G06K 9/00295; G06K 9/00302; G06K 9/00308; G06K 9/00315; G06K 9/0061; G06K 9/00617; G06K 9/00597; G06K 9/4604; G06K 9/4652; G06K 9/4671; G06K 9/4676; G06K 9/468
USPC ........ 382/115–118, 124, 128, 170, 181, 199, 382/204
See application file for complete search history.

(56) References Cited

U.S. PATENT DOCUMENTS

| | | | |
|---|---|---|---|
| 2008/0267459 A1* | 10/2008 | Nakada | G09B 19/00 382/118 |
| 2009/0285455 A1 | 11/2009 | Li et al. | |
| 2010/0189358 A1* | 7/2010 | Kaneda | G06K 9/00744 382/195 |
| 2011/0141258 A1 | 6/2011 | Song et al. | |
| 2012/0169895 A1* | 7/2012 | Wan | H04N 5/23219 348/222.1 |
| 2014/0369571 A1* | 12/2014 | Tsukizawa | G06K 9/00248 382/118 |
| 2015/0310262 A1 | 10/2015 | Do et al. | |
| 2016/0328875 A1* | 11/2016 | Fang | G06T 5/002 |
| 2019/0122376 A1* | 4/2019 | Xi | G06T 11/60 |
| 2019/0197329 A1* | 6/2019 | Aoyagi | A61B 5/1128 |

FOREIGN PATENT DOCUMENTS

| | | |
|---|---|---|
| CN | 103778360 | 5/2014 |
| CN | 105975935 | 9/2016 |
| JP | 2010-117948 | 5/2010 |
| JP | 2011-192008 | 9/2011 |
| JP | 2014-219703 | 11/2014 |
| WO | 2015139231 | 9/2015 |

OTHER PUBLICATIONS

Office Action dated Jun. 13, 2019 in Japanese Patent Application No. 2018-526870. (With English Translation) p. 1-6.
Combined Office Action and Search Report dated Nov. 21, 2018 in Chinese Patent Application No. 201610293280.9 (with Concise English language translation).
Office Action dated Feb. 27, 2019 in Chinese Patent Application No. 201610293280.9 (with Concise English language translation).
Written Opinion dated Jul. 20, 2017 in PCT/CN2017/082776 filed May 2, 2017. (With English Translation).
International Preliminary Report dated Nov. 6, 2018 in PCT/CN2017/082776 filed May 2, 2017. (With English Translation).

* cited by examiner

Facial image

Map

Synthesis

US 10,783,354 B2

FACIAL IMAGE PROCESSING METHOD AND APPARATUS, AND STORAGE MEDIUM

RELATED APPLICATION

This application is a continuation of International Application No. PCT/CN2017/082776, filed on May 2, 2017, which claims priority to Chinese Patent Application No. 201610293280.9, entitled "FACIAL IMAGE PROCESSING METHOD AND APPARATUS, AND STORAGE MEDIUM" filed on May 4, 2016. The entire disclosures of the prior applications are hereby incorporated by reference herein in their entirety.

FIELD OF THE TECHNOLOGY

The present disclosure relates to image processing technologies, and in particular, to a facial image processing method and apparatus, and a storage medium.

BACKGROUND OF THE DISCLOSURE

The facial extraction technology is an emerging image processing direction, where extraction may be performed by reading an input image or video stream, and is used in an application scenario such as photography or identity authentication. Facial extraction in the related technologies can merely achieve extracting facial features of a face, but cannot effectively recognizing a facial action, such as mouth opening, kissing, eyebrow raising, or head shaking, of a user.

SUMMARY

In view of this, embodiments of the present disclosure provide a facial image processing method and apparatus, and a storage medium, so as to accurately recognize a facial action of a user from a facial image.

A method for image processing and an apparatus having a processing circuitry is described. For example, the processing circuitry extracts, from a first image of a face, first values of feature points of a facial organ on the face. The feature points of the facial organ are indicative of characteristics of the facial organ. Then, the processing circuitry calculates first distances between the feature points of the facial organ based on the first values of the feature points. Further, the processing circuitry calculates feature parameters of the facial organ according to the first distances between the feature points. Then, the processing circuitry detects a facial action of the face when the feature parameters satisfy a preset condition associated with the facial action.

To calculate the first feature parameters of the facial organ, in some embodiments, the processing circuitry calculates size parameters at multiple positions of the facial organ according to the first distances between the feature points. Further, the processing circuitry calculates a ratio of a first size parameter of the size parameters to a second size parameter of the size parameters. Then, the processing circuitry compares the ratio to a preset threshold associated with the facial action of the facial organ to detect the facial action.

According to an aspect of the disclosure, the feature points include a plurality of lip feature points of an upper lip and a lower lip on the face. The processing circuitry calculates a lip opening between the upper lip and the lower lip, and a lip thickness according to distances between the lip feature points. Further, the processing circuitry calculates a ratio of the lip opening to a lip thickness, and compares the ratio to a preset threshold associated with a lip opening action to detect the lip opening action.

In some embodiments, the plurality of lip feature points includes a first center point of a bottom edge of the upper lip on the face, a second center point of a top edge of the lower lip and a third center point of a bottom edge of the lower lip. The processing circuitry calculates the lip opening according to a distance between the first center point and the second center point, and calculates the lip thickness according to a distance between the second center point and the third center point.

According to another aspect of the disclosure, the feature points include a plurality of lip feature points of an upper lip and a lower lip of a mouth on the face. The processing circuitry then calculates a mouth thickness and a mouth width according to distances between the lip feature points. Further, the processing circuitry calculates a ratio of the mouth thickness to the mouth width, and compares the ratio to a preset threshold associated with a kiss action to detect the kiss action.

In some embodiments, the plurality of lip feature points includes a left corner point of the mouth, a right corner point of the mouth, a first center point of a top edge of the upper lip and a second center point of a bottom edge of the lower lip. The processing circuitry then calculates the mouth thickness according to a distance between the first center point and the second center point, and calculates the mouth width according to a distance between the left corner point and the right corner point.

Further, in an example, the processing circuitry extracts, from a second image of the face, second values of the feature points of the facial organ on the face. Then, the processing circuitry calculates second distances between the feature points of the facial organ based on the second values of the feature points, and calculates the feature parameters of the facial organ according to changes from the first distances to the second distances.

In some embodiments, the feature points include eyebrow feature points and eye feature points. Then, the processing circuitry calculates a first eyebrow-eye distance between an eyebrow feature point and an eye feature point in the first image. Further, the processing circuitry calculates a second eyebrow-eye distance between the eyebrow feature point and the eye feature point in the second image. Then, the processing circuitry calculates a change based on the first eyebrow-eye distance to the second eyebrow-eye distance, and compares the change to a preset threshold associated with an eyebrow raising action to detect the eyebrow raising action from the first image to the second image.

In an example, the processing circuitry calculates a first center distance between eyes and eyebrows and a first outer distance between the eyes and the eyebrows in the first image, and calculates a first ratio of the first center distance to the first outer distance. Then, the processing circuitry calculates a second center distance between the eyes and eyebrows and a second outer distance between the eyes and the eyebrows in the second image and calculates a second ratio of the second center distance to the second outer distance. Further, the processing circuitry calculates the change as a difference between the first ratio and the second ratio. In an example, the feature points comprise eye feature points. The processing circuitry detects respective open/close status of an eye in a plurality of images according to values of the eye feature points that are extracted from respective images, and determines an eye blinking action associated with a change pattern of the open/close status of the eye in the plurality of images.

In some embodiments, the plurality of eye feature points comprises center points of an eye and outer points of the eye. The processing circuitry calculates an eye open of the eye based on the center points of the eye and calculates an eye width of the eye based on the outer points of the eye. Further, the processing circuitry calculates a ratio of the eye open to the eye width and detects the open/close status of the eye based on the ratio.

According to an aspect of the disclosure, the feature points include a nose feature point and face edge feature points. The processing circuitry detects respective orientation of the face in a plurality of images according to values of the nose feature point and the face edge feature points that are extracted from respective images and determines a head shaking action associated with a change pattern of the orientation of the face in the plurality of images. In an embodiment, the nose feature point comprises a nasal tip point, the face edge feature points comprise a left outer edge center point and a right outer edge center point. The processing circuitry calculates a left face width based on the nasal tip point and the left outer edge center point and calculates a right face width based on the nasal tip point and the right outer edge center point. Then, the processing circuitry calculates a ratio of the left face width to the right face width and detects the orientation of the face based on the ratio.

In some embodiments, the first image and the second image are among a plurality of images that is taken consecutively in a time duration.

In an embodiment, the processing circuitry adds a sticker picture in association with the facial action to a top layer of the first image. In another embodiment, the processing circuitry performs a special effect deformation processing in association with the facial action for the facial organ.

Aspects of the disclosure also provide a non-transitory computer-readable medium storing instructions. The instructions can be executed by a computer to cause the computer to perform operations for image processing.

The embodiments of the present disclosure have the following beneficial effects:

In a facial image-based feature point extraction manner, features of a facial organ at different positions are obtained by calculating distances between facial feature points of the facial organ. Because when a facial action occurs, an organ involved in the facial action necessarily reflects changes of feature parameters of the facial organ at different positions, a technical effect of accurately recognizing a facial action can be implemented by presetting conditions (preset conditions) corresponding to feature parameters for different facial actions and comparing the conditions with feature parameters of the facial organ extracted from the facial image.

BRIEF DESCRIPTION OF THE DRAWINGS

To describe the technical solutions in the embodiments of the present disclosure or in the related technology more clearly, the following briefly describes the accompanying drawings required for describing the embodiments or the related technology. The accompanying drawings in the following description show merely some embodiments of the present disclosure, and a person of ordinary skill in the art may still derive other drawings from these accompanying drawings.

FIG. 1-2 is a schematic diagram of using a facial image processing apparatus in a scenario in an embodiment of the present disclosure;

FIG. 2 is a schematic flowchart of a facial image processing method in an embodiment of the present disclosure;

DESCRIPTION OF EMBODIMENTS

Figure 1:
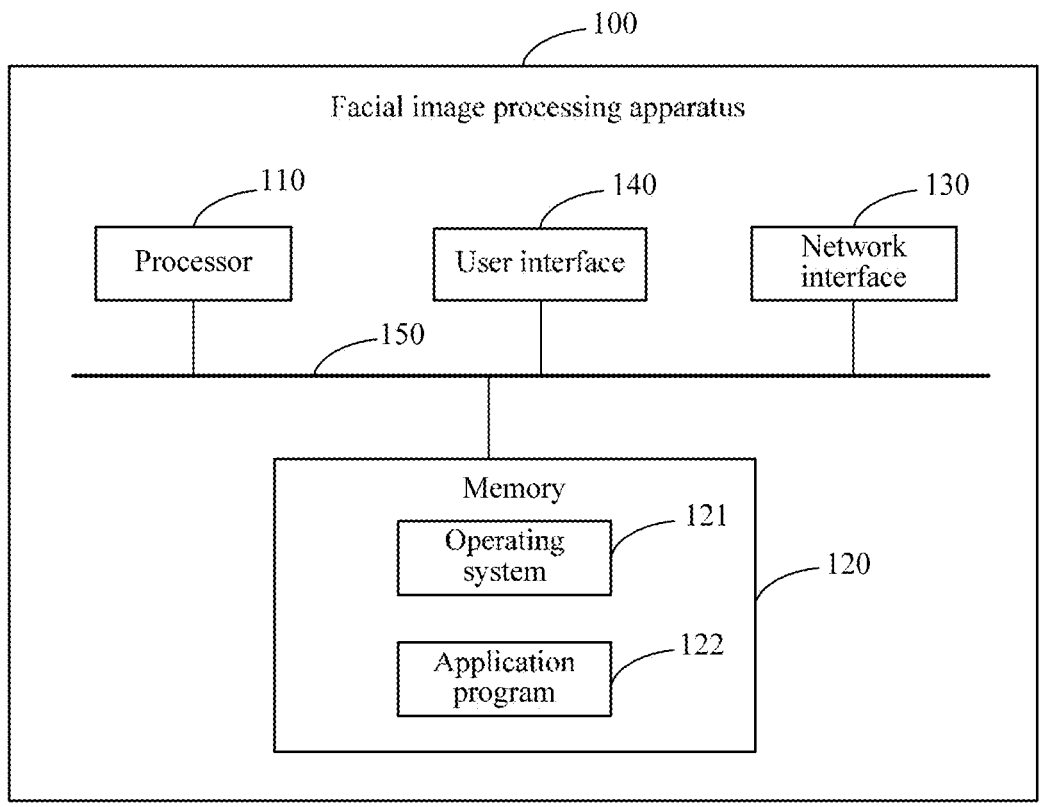
FIG. 1-1 is a structural diagram of hardware of a facial image processing apparatus in an embodiment of the present disclosure.

The following describes the technical solutions in the embodiments of the present disclosure with reference to the accompanying drawings in the embodiments of the present disclosure. The described embodiments are some embodiments instead of all embodiments of the present disclosure. All other embodiments obtained by a person of ordinary skill in the art based on the embodiments of the present disclosure shall fall within the protection scope of the present disclosure.

Before the present disclosure is further described in detail, names and terms involved in the embodiments of the present disclosure are described, and the names and terms involved in the embodiments of the present disclosure apply to the following explanations.

1) A facial image is an electronic image including a face, or an image frame including a face in video data. The electronic image may be a picture in a format such as Joint Photographic Experts Group (JPEG) or Graphics Interchange Format (GIF). The image frame may be a series of continuous (that is, continuously distributed on a time axis of a video) image frames including a face in a video or s discrete (that is, discretely distributed on a time axis of a video) image frames including a face in a video).

2) A facial feature point corresponds to a local feature, having a recognizable property, of a face, the feature point may be described by using a set of a plurality of pixel points and coordinates thereof, the facial feature point is a feature point used for representing a facial organ, and each facial organ corresponds to one or more feature points. For example, the feature point may include an eye feature point, a nose feature point, a lip feature point, an eyebrow feature point, and a facial edge feature point.

3) Facial feature point extraction is extracting feature point of a corresponding facial organ at different position from a facial image, and facial feature points and their extraction manners are described on the following different dimensions:

3.1) Color Feature

A color feature describes a surface color of a facial organ, the color feature is a feature based on a pixel point, and color space expressions, such as red, green, and blue (RGB), hue, saturation, and value (HSV), may be used to describe the color feature. In an example of extracting a color feature-based facial feature point, a facial image is converted into a histogram, and feature points whose color distribution conforms to different positions of a facial organ are extracted the from histogram as feature points at corresponding positions.

3.2) Texture Feature

Surface texture at different position in a facial image is described. A statistical method is a typical method of extracting a texture feature from the facial image. For example, texture features conforming to different positions of a facial organ are extracted from an autocorrelation function of the facial image (that is, an energy spectrum function of an image). That is, feature parameters, such as coarseness and directivity, of the texture are extracted by calculating the energy spectrum function of the image, and feature points of the texture features conforming to the different positions of the facial organ are used as feature points at corresponding positions.

3.3) Scale-Invariant Feature

A scale-invariant feature is a local feature that a scale keeps stable in a facial image when the facial image is rotated or translated. Typically, a scale space is established by using a Scale-Invariant Feature Transform (SIFT) algorithm and by using convolution of an original facial image and a Gaussian kernel, and a scale-invariant feature point is extracted from a difference of Gaussian space pyramid.

3.4) Shape Feature

External contours at different positions in a facial organ are described. A typical manner is using edge detection. An edge feature method is describing an edge feature to obtain a shape parameter of an image. As an example of contour detection, a facial image is converted into a grayscale image, and the grayscale image is searched for a pixel point where brightness obviously varies (for example, exceeding a brightness change threshold) as an edge.

It is pointed out that the foregoing manners of extracting facial feature points at different positions of a facial organ on different dimensions can be used alternatively or in combination. It could be understood that for a facial feature point extracted from a facial image, a location thereof and a pixel point included therein are determined. The facial feature point may be expressed by using a geometric center location or a geometric center gravity location of a corresponding pixel point location, or any pixel point location.

The embodiments of the present disclosure provide a facial image processing method, a facial image processing apparatus for implementing the facial image processing method, and a storage medium.

The facial image processing apparatus may be implemented in many manners. For example, the facial image processing apparatus may be implemented as a user terminal such as a personal computer, a tablet computer, a notebook computer, a smartphone, an e-reader, a digital camera, a digital video camera, and an intelligent wearable device. For another example, the facial image processing apparatus may be implemented as a server deployed on a network side. If the facial image processing apparatus is implemented as a user terminal, the foregoing user terminal for implementing the facial image processing method may be provided with a camera module, configured to timely obtain a facial image of a user, or may obtain a facial image of a user from a network or another device by means of data transmission. In the following implementation procedure of the facial image processing method, the facial image processing apparatus in the embodiments of the present disclosure is used as an implementation subject.

For example, referring to FIG. 1-1, FIG. 1-1 is a structural diagram of hardware of a facial image processing apparatus 100 in an embodiment of the present disclosure, including: at least one processor 110, a memory 120, at least one network interface 130, and a user interface 140. Components in the facial image processing apparatus 100 are coupled together by means of a bus system 150. It could be understood that the bus system 150 is configured to implement connection and communication between the components. In addition to a data bus, the bus system 150 further includes a power supply bus, a control bus, and a status signal bus. However, for ease of clear description, all types of buses in FIG. 1-1 are marked as the bus system 150.

The user interface 140 may be implemented as a display, a keyboard touch pad, or a touchscreen according to requirements.

It could be understood that the memory 120 may be a volatile memory or a non-volatile memory, or may include both of a volatile memory and a non-volatile memory. The memory 120 described in the embodiments of the present disclosure is intended to include, but not limited to, the memories and a memory of any another suitable type.

The memory 120 in the embodiments of the present disclosure is configured to store different types of data to support operations of the facial image processing apparatus 100. Examples of the data include: any computer program, such as an operating system 121 and application program 122, used for performing an operation on the facial image processing apparatus 100; original data of a facial image, intermediate data of facial image processing, final data of the facial image processing, and the like.

The operating system 121 includes various system programs, such as a framework layer, a core library layer, and a driver layer, used for implementing various basic tasks and processing hardware-based tasks. The application program 122 may include various application programs, such as a media player and a browser, used for implementing various application services. A program for implementing the method of the embodiments of the present disclosure may be included in the application program 122 as a functional module, or certainly may be provided as an application program dedicated for facial image processing.

The method disclosed in the embodiments of the present disclosure may be applied to the processor 110, or may be implemented by the processor 110 based on pure hardware, or may be implemented based on a combination of software and hardware.

For a pure hardware implementation, the processor 110 may be an integrated circuit chip, having a signal processing capability. In an implementation process, steps of the method provided by the embodiments of the present disclosure may be performed by an integrated logic circuit of hardware in the processor 11. For example, in an exemplary embodiment, the facial image processing apparatus 100 may be implemented as, for example, an Application-Specific Integrated Circuit (ASIC), a Complex Programmable Logic Device (CPLD), or a Field-Programmable Gate Array (FPGA) having a built-in hardware decoding processor, configured to implement the facial image processing method provided by the embodiments of the present disclosure.

For an implementation combining software and hardware, the foregoing the processor 110 may be implemented as a combination of a general-purpose processor and a software module. The software module may be located in a storage medium, the storage medium is located in the memory 120, and the processor 110 reads data in the memory 120 and implements the facial image processing method provided by the embodiments of the present disclosure by combining the data with the hardware thereof.

Figures 1, 2:
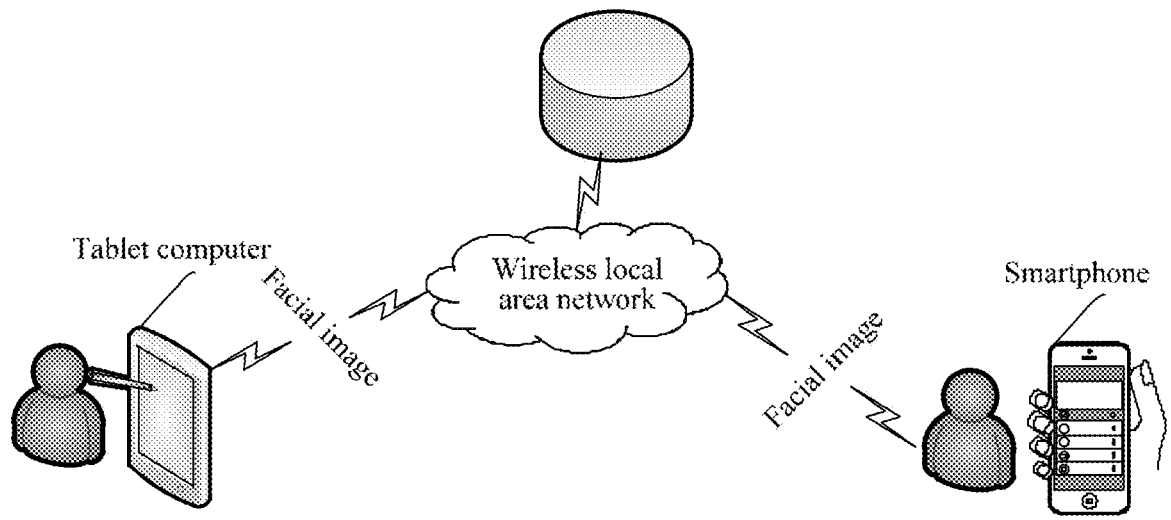
Figure 2:
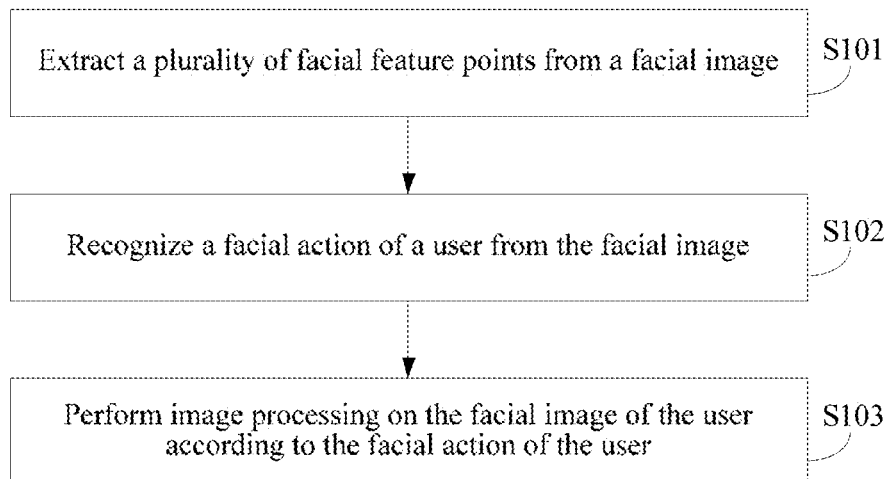

Referring to FIG. 1-2, FIG. 1-2 is a schematic diagram of an optional application scenario of a facial image processing apparatus according to an embodiment of the present disclosure. The facial image processing apparatus is implemented as a smartphone or a tablet computer. In addition to calling a camera module thereof to perform image capturing to obtain a facial image, the smartphone may alternatively obtain a facial image captured by a tablet computer in various wired communication manners, such as a universal serial bus (USB), or various wireless communication manners (such as cellular wireless communication or a wireless local area network), and certainly, may alternatively obtain a facial image from a facial image database and upload the facial image captured by the smartphone to the facial image database in various communication manners.

FIG. 2 is a schematic flowchart of a facial image processing method in an embodiment of the present disclosure. As shown in FIG. 2, the facial image processing method in this embodiment of the present disclosure may include the following procedure:

S101: Extract a plurality of facial feature points from a facial image.

It could be understood that for recognizing a facial action from a frame of facial image, in S101, facial feature points of different facial organs are extracted from a frame of to-be-recognized facial image; and for recognizing a facial action from a plurality of frames of facial images, in S101, feature extraction is separately performed on the plurality of frames of facial images to obtain a plurality of facial feature point corresponding to a facial feature in all the frames of facial images.

In an optional embodiment, a facial image processing apparatus may perform photography by calling a camera module of the facial image processing apparatus, to obtain one or more facial images including the face of a user, and extract a facial feature point from the facial image obtained by photography. For example, in terms of extraction on a dimension of a shape feature, different facial organs are detected by using an external contour feature, and facial feature points at different positions of the facial organs are extracted.

In another optional embodiment, the facial image processing apparatus may alternatively obtain a plurality of frames of facial images, and separately perform extraction on the plurality of frames of captured facial images, to obtain locations of a plurality of facial feature points in each facial image. The plurality of frames of facial images may be captured continuously. For example, the facial images may be a plurality of continuous frames of facial images in a video captured in a designated time length such as 1 second or 0.5 seconds. Certainly, the facial images may alternatively be a plurality of frames of facial images discretely distributed on a time axis in a captured video.

The facial feature point includes one or more of an eye feature point, a nose feature point, a lip feature point, an eyebrow feature point, and a facial edge feature point.

Figure 3:
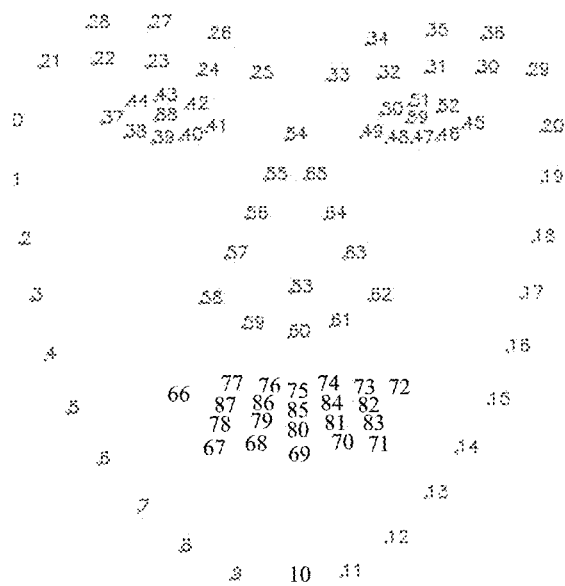
FIG. 3 is a schematic diagram of extracting a plurality of facial feature points from a facial image of a user in an embodiments of the present disclosure.

Exemplarily, extraction results of facial feature points shown in FIG. 3 may be obtained. For convenience of description below, each extracted facial feature point is marked with a numeral. For example, 1 to 20 shown in FIG. 3 represent facial edge feature points, 21 to 28 and 29 to 36 correspondingly represent left eyebrow feature points and right eyebrow feature points of a user, 37 to 44 and 88 represent left eye feature points of the user, where 88 represents the left eye pupil, 45 to 51 and 89 represent right eye feature points of the user, where 8 represent a right eye pupil feature point, 53 to 65 represent nose feature points of the user, and 66 to 87 represent lip feature points of the user. It is pointed out that the above are merely examples. In an optional embodiment, either extracting some of the foregoing facial feature points or more feature points, or marking each feature point in another manner belongs to the category of this embodiment of the present disclosure.

S102: Recognize a facial action of a user from the facial image.

In an optional embodiment, recognizing a facial action may be implemented by means of the following steps:

S1021: For a plurality of feature points corresponding to any facial organ, calculate distances between a plurality of facial feature points corresponding to a same facial organ.

In S101, after the plurality of facial feature points of the facial organ is extracted from the facial image, locations of the feature points in the facial image can be determined according to distribution of the feature points in the facial image. For the specific locations, a plane coordinate system may be established on the facial image, and a planar distance between any two facial feature points of a same facial organ is calculated as a feature point distance.

S1022: Calculate feature parameters of the facial organ at different positions according to the distances between the facial feature points.

In an optional embodiment, for recognizing a facial action from a frame of facial image, feature parameters indicating sizes of the facial organ at different positions are calculated according to the distances between the plurality of feature points corresponding to the facial organ. That is, the feature parameters may be distances between different positions of the facial organ such as a distance between the upper lip and the lower lip.

In an optional embodiment, for recognizing a facial action from a plurality of frames of facial images, in S101, features parameters are determined according to distances between a plurality of facial feature points of the facial organ in all the frames of facial images, and the feature parameters represent changes of the distances between the plurality of frames of facial images. That is, the feature parameters may be changes of the distances between the different positions (for example, the eyebrows and eyes) of the facial organ, for example, a case in which whether eye opening and eye closing alternately appear in the plurality of frames of facial images, and a case in which the left face and the right face alternately appear in the plurality of frames of facial images.

S1023: Determine, if the feature parameters satisfy a preset condition corresponding to a facial action, that the facial organ forms the facial action in the facial image.

In an optional embodiment, for recognizing a facial action from a frame of facial image, at least two feature parameters indicating sizes of the facial organ at different positions are used to recognize a facial action, the feature parameter are set as a first feature parameter and a second feature parameter. If a ratio of the first feature parameter to the second feature parameter is not less than a preset threshold, it is determined that the facial image includes a facial action formed by the facial organ. That is, the preset condition corresponds to the facial action formed by the facial organ, and is used for describing a condition satisfied by the distances between different positions of the facial organ when the facial organ forms the facial action.

For example, for a facial action of mouth opening, a preset condition may be that a distance used for describing a ratio of a lip opening spacing (corresponding to the first feature parameter) to a lip thickness (corresponding to the second feature parameter) needs to be less than a first preset threshold, for a facial action of kissing, a preset condition may be that a ratio of a lip thickness to a lip width needs to be less than a second preset threshold (the second preset threshold is less than 1).

In an optional embodiment, for recognizing a facial action from a plurality of frames of facial images, if changes of the distances between the plurality of frames of facial images satisfy a preset condition for a change when the facial organ forms a facial action, it is determined that the facial organ forms a facial action in the facial image. That is, the preset condition corresponds to the facial action formed by the facial organ, and is used for describing changes of positions of the facial organ in the plurality of frames of facial images when the facial organ forms a facial action in the plurality of frames of facial images.

For example, for a facial action of eyebrow raising, the preset condition may be that a distance between the eyebrow and the eye varies in the plurality of frames of facial images; for an eye action of eye blinking, the preset condition may be that eye opening and eye closing alternately appear in the plurality of frames of facial images.

In a specific implementation, a plurality of facial actions, for example, one or more of an eye action (such as eye blinking or squinting), a mouth action (such as kissing, mouth opening, and tongue wagging), an eyebrow action (such as eyebrow raising and frowning), and a head action (for example, head lowering, head raising, nodding, head shaking, and head wobbling), the user can be pre-defined.

In addition, for each facial action, a plurality of corresponding facial feature points (that is, feature points corresponding to positions involved in a facial action) is pre-defined. For example, for a mouth opening action, involved facial positions are the upper lip and the lower lip, a distance between a lower edge center feature point of the upper lip and a lower edge center feature point of the upper lip exceeds 10 pixels (or being converted into another distance unit), so that according to a lower edge center location 85 of the upper lip and an edge center location 80 of the upper lip extracted from a facial image of a current user, if a distance between 85 and 80 exceeds 10 pixels, it is determined that a current facial action of the user is mouth opening.

In an optional embodiment, for a plurality of groups of feature points of a facial organ extracted from a frame of facial image, whether the facial organ forms a facial action is determined according to relationships obtained by comparing distances between the plurality of groups of facial feature points.

For example, a preset condition for a mouth opening action is defined as that: if a ratio of a lip opening spacing of the user to a lip thickness is not less than a first preset threshold, a lip opening spacing and a lip thickness of the user can be determined according to distances between a plurality of lip feature points extracted from the facial image, and if a ratio of the lip opening spacing to the lip thickness is not less than the first preset threshold, it is determined that a current facial action of the user is a mouth opening action. For example, the first preset threshold may be ⅔.

Exemplarily, as shown in FIG. 3, a distance between a lower edge center feature point 85 of the upper lip of the user and an upper edge center feature point 80 of the lower lip is extracted as a lip opening spacing, and a distance between the upper edge center feature point 80 of the lower lip and a lower edge center feature point 69 is extracted as a lip thickness. In another optional embodiment, distances between other extracted feature points may alternatively be used. For example, a distance between a feature point 70 and a feature point 81 may be used to present a lip thickness, or a distance between 81 and 84 may be used to represent a lip opening spacing.

For another example, a preset condition for a kissing action may be defined as that: a ratio of a mouth thickness to a mouth width of a user is not less than a second preset threshold, where the second preset threshold is less than 1, for example, is ½. The facial image processing apparatus can obtain a mouth thickness and a mouth width of a user by calculating distances between a plurality of lip feature points, and determine, if a ratio of the mouth thickness to the mouth width is not less than a second preset threshold, that a facial action of the user is a kissing action.

Exemplarily, as shown in FIG. 3, a distance between the upper edge center feature point 75 of the upper lip of the user and the lower edge center feature point 69 of the lower lip is calculated as a mouth thickness; and a distance between a left mouth corner feature point 66 of the user and a right mouth corner feature point 72 is calculated as a mouth width.

In another optional embodiment, distances between other extracted feature points may alternatively be used to represent a mouth thickness and a mouth width. For example, a distance between a feature point 74 and a feature point 80 or a distance between 76 and 68 may both be used to represent a mouth thickness, or a distance between 67 and 71 is used to represent a lip opening spacing.

In an optional embodiment, for recognizing a facial action from a plurality of frames of facial images, if changes of different positions of a facial organ in the plurality of frames of facial images are determined according to the distances between a plurality of facial feature points of the facial organ. For example, in a plurality of frames of continuously captured facial images (the plurality of frames of continuously captured facial images in S101), according to whether changes of the facial organ at different positions satisfy a preset condition, it is determined that the facial organ forms a facial action in the plurality of frames of facial images.

For example, a preset condition corresponding to an eyebrow raising action may be defined as that: in a plurality of frames of continuously captured facial images, a change amount of the spacing between the eyebrow and the eye in two frames of facial images exceeds a third preset threshold. The facial image processing apparatus may obtain, according to a distance between an eyebrow feature point and an eye feature point of the user, a spacing between an eyebrow and an eye, and determine, if in the plurality of frames of continuously captured facial images, a change amount of the spacing between the eyebrow and the eye in two frames of facial images exceeds a third preset threshold, that a facial action of the user is an eyebrow raising action.

Exemplarily, as shown in FIG. 3, a distance between 23 and 39 may be used to represent a spacing between an eyebrow and an eye of a user. If in the plurality of frames of continuously captured facial images, a difference between ratios of a first eyebrow-eye spacing to a second eyebrow-eye spacing in two frames of facial images exceeds a third preset threshold (the third preset threshold herein, for example, may be 10 pixels), it is determined that a facial action of the user is a eyebrow raising action.

In another example, a first eyebrow-eye spacing between an eyebrow tail position 21 of the user and a lower edge center position 39 of an eye on the same side and a second eyebrow-eye spacing between the eyebrow tail position 21 of the user and an outer eye corner position 37 on the same side can be obtained. If in the plurality of frames of continuously captured facial images, a difference between ratios of the first eyebrow-eye spacing to the second eyebrow-eye spacing in two frames of facial images exceeds a third preset threshold (the third preset threshold herein, for example, may be 0.3 or 0.2), it is determined that a facial action of the user is a eyebrow raising action.

For another example, a preset condition for an eye blinking action may be defined as that: in a plurality of frames of continuously captured facial images, eye opening-eye closing-eye opening facial images sequentially appear. That is, there is a frame of eye closing facial image of the user between two frames of eye opening facial images of the user. The facial image processing apparatus can calculate an eye opening spacing of the user according to distances between a plurality of eye feature points of the user, and determine that the user is eye-opening or eye-closing according to the eye opening spacing of the user in a specific frame of facial image.

For example, as shown in FIG. 3, a distance between 43 and 39 may be used as an eye opening spacing. If a distance between the eye 43 and 39 in a frame of facial image is greater than a preset spacing, for example, 5 pixels, it is determined that the eyes of the user are open. Otherwise, if the eye opening spacing is less than the preset spacing, it is determined that the eyes of the user are closed. In another example, the facial image processing apparatus may use a distance between an upper edge center location 43 of an eye of the user and a lower edge center location 39 as an eye opening spacing, additionally obtain a distance between the lower edge center location 39 of the eye of the user and an outer eye corner location 37 as an eye width, and if the eye opening spacing in a frame of facial image is greater than a half of the eye width, determine that the eyes of the user are open in the frame of facial image; otherwise, determine that the eyes of the user are closed in the frame of facial image.

For another example, a preset condition corresponding to a head shaking action may be defined as that: in a plurality of frames of continuously captured facial images, there are a frame of facial image of a left face and a frame of facial image of a right face. The facial image processing apparatus may obtain a left facial width and a right facial width of the user according to a nose feature point and facial edge feature points of the user, and determine, according to the left facial width and the right facial width of the user, that a specific frame of facial image is a left face or a right face of the user.

Exemplarily, a distance between a nasal tip location 53 of the user and a left outer edge center location of the face (any one of 2-5 may be selected) may be used as a left facial width, and a distance between the nasal tip location 53 of the user and a right outer edge center location of the face (any one of 15-18 may be selected) may be used as a right facial width. If a ratio of the left facial width to the right facial width in a specific frame of facial image is less than a fourth preset threshold, it is determined that the frame of facial image is the right face of the user, where the fourth preset threshold is less than 1, for example, is 0.7. On the contrary, if a ratio of the right facial width to the left facial width in a specific frame of facial image is less than the fourth preset threshold, it is determined that the frame facial image is the left face of the user.

It is pointed out that the above are merely examples. A person skilled in the art can obtain more instances without paying an inventive effort from the foregoing examples. For example, a nodding action, a frowning action, a face making action, a tongue wagging action, and the like of the user may be recognized. Exhaustion is not performed in the present disclosure.

In an optional embodiment, for a facial action recognized from a facial image, image processing, such as forming various special effects, can be performed on the facial action.

S103: Perform image processing on the facial image of the user according to the facial action of the user.

In a specific implementation, the facial image processing apparatus may preset image processing manners corresponding to various defined facial actions, and after obtaining a facial action of a user by facial image reorganization, perform corresponding image processing on the facial image. For example, a manner of performing image processing on a facial image may include:

1) A preset map (e.g., a sticker picture) corresponding to a facial action of a user is used and added to a map layer located on the top of the facial image to form an effect of mapping (e.g., overlapping) the facial image.

Figure 9:
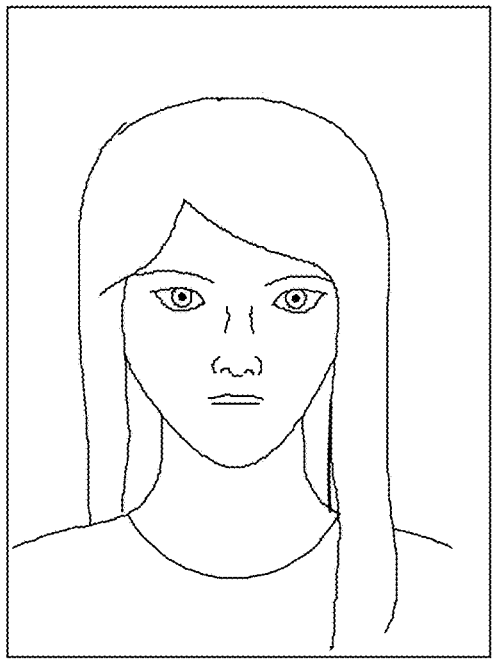
FIG. 9 is a schematic diagram of an effect of performing mapping according to a mouth opening action of a user in an embodiment of the present disclosure.
Figure 9:
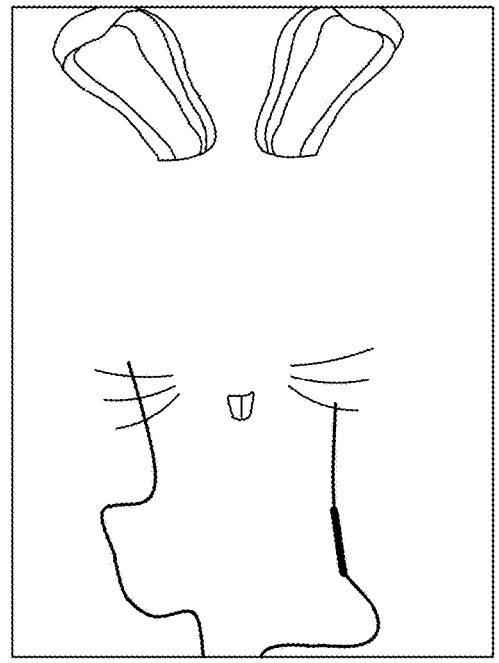
Figure 9:
Figure 9:
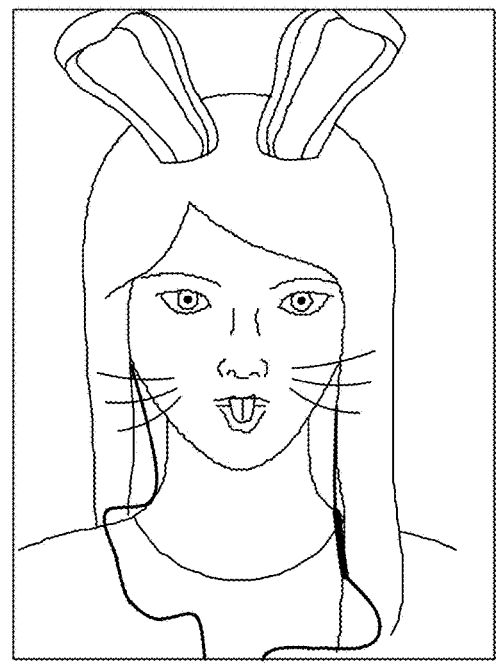
Figure 11:
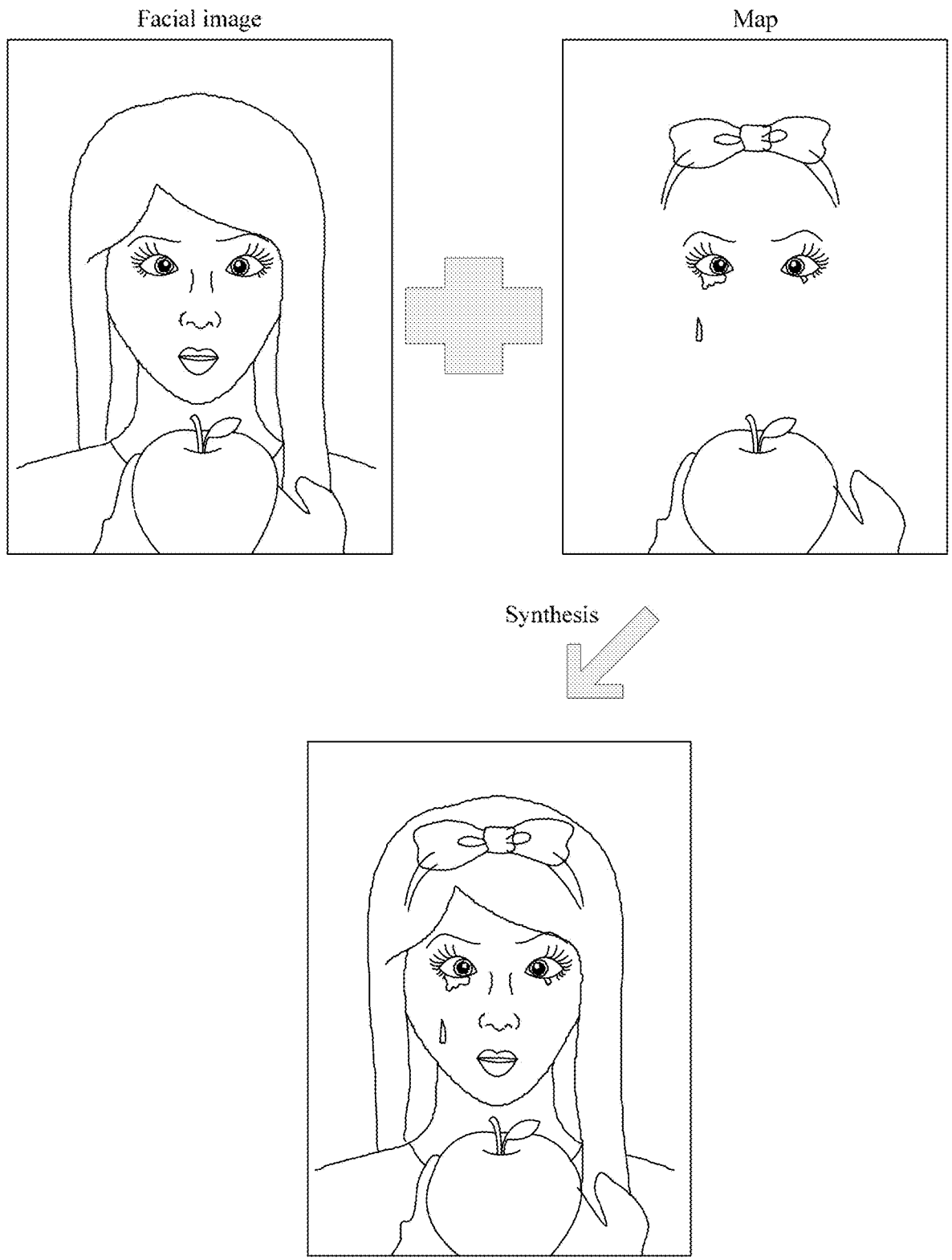
FIG. 11 is a schematic diagram of an effect of performing mapping according to an eye blinking action and a kissing action of a user in an embodiment of the present disclosure.

The facial image processing apparatus can preset a plurality of maps respectively corresponding to different facial actions of the user, and after a facial action of the user is extracted from the facial image, a corresponding map is used for performing mapping on the facial image. Exemplarily, as shown in FIG. 9 and FIG. 11, corresponding mapping effects may be produced according to recognized different facial actions of the user. It is noted that the descriptions herein are merely examples. A person skilled in the art can obtain more mapping instances without paying an inventive effort according to the examples in the embodiments of the present disclosure. Exhaustion is not performed in the present disclosure.

In FIG. 9, mapping of "rabbit teeth" may be performed on a facial image when it is determined that the user in the facial image is opening mouth. A "rabbit teeth" map is displayed at a lower edge center point location of the upper lip of the user in a superimposed manner. Certainly, the "rabbit teeth" map may be superimposed at any location in the facial image, and a superimposition display location of the "rabbit teeth" map in the facial image may alternatively be changed according to a movement instruction of the user for the "rabbit teeth" map.

Figure 10:
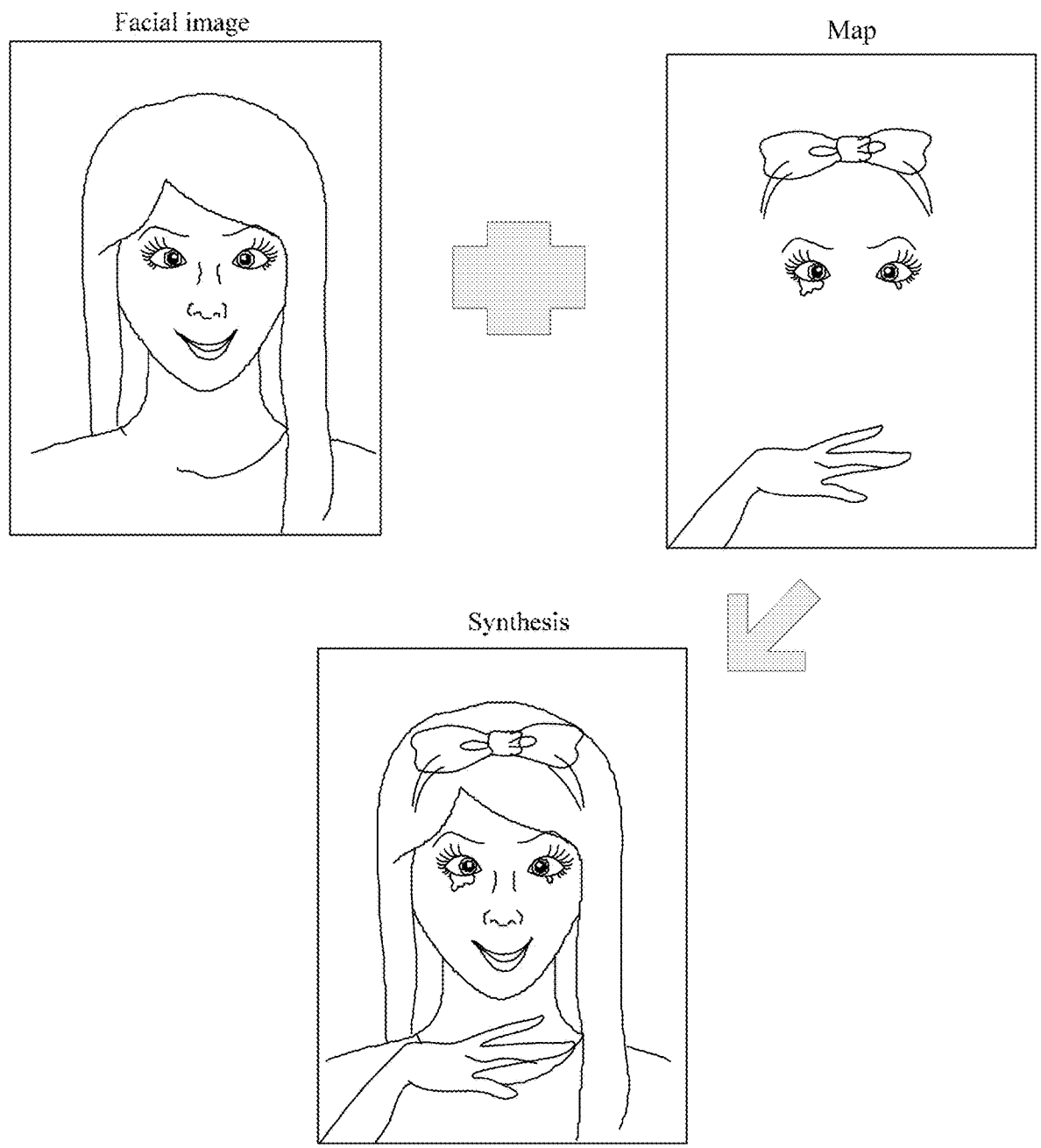
FIG. 10 is a schematic diagram of an effect of performing mapping according to an eye blinking action of a user in an embodiment of the present disclosure.

In FIG. 10, mapping of "tearfully eyes of a princess" may be performed on a facial image when it is determined that the user in the facial image is blinking. A tearful eye part of a "tearfully eyes of a princess" map can be displayed at an eye location of the user in the facial image in a superimposed manner. Certainly, the "tearfully eyes of a princess" map may alternatively be superimposed at any location in the facial image, and a superimposition display location of the "tearfully eyes of a princess" map in the facial image may alternatively be changed according to a movement instruction of the user for the "tearfully eyes of a princess" map.

In FIG. 11, if it is determined that the user in the facial image performs a kissing action while performing an eye blinking action, correspondingly, an "apple passing" map can also be added while the "tearfully eyes of a princess" map is added to the facial image.

2) A facial object corresponding to the facial action of the user is determined, and corresponding special effect deformation processing is performed for the facial object corresponding to the facial action of the user.

For example, if an eye action of the user in the facial image is recognized, special effect deformation processing can be performed on the eye area of the user in the facial image. If a mouth action of the user in the facial image is recognized, special effect deformation processing can be performed on the mouth area of the user in the facial image. If an eyebrow action of the user in the facial image is recognized, special effect deformation processing can be performed on the eyebrow area of the user in the facial image. If a head action of the user in the facial image is recognized, special effect deformation processing can be performed on the head area of the user in the facial image. The special effect deformation processing may include enlarging, lengthening, blurring, or the like.

In this embodiment of the present disclosure, a facial action of a user in a facial image is determined by calculating distances between a plurality of facial feature points recognized from the facial image, and image processing is performed on the facial image according to the facial action of the user, so as to perform dynamic processing on the facial image according to different facial actions or expressions of the user.

Figure 4:
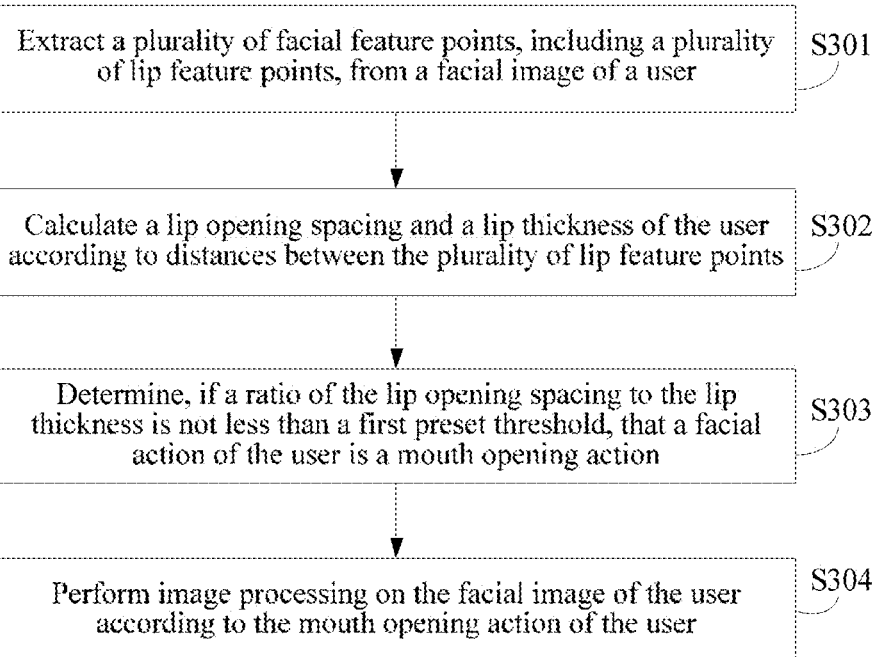
FIG. 4 is a schematic flowchart of a facial image processing method in another embodiment of the present disclosure.

FIG. 4 is a schematic flowchart of a facial image processing method in an embodiment of the present disclosure. As shown in FIG. 4, a procedure of the facial image processing method in this embodiment of the present disclosure includes the following.

S301: Extract a plurality of facial feature points, including a plurality of lip feature points, from a facial image of a user.

In an optional embodiment, the facial image processing apparatus may capture a facial image of a user by using a camera module and perform facial feature extraction on the captured facial image in real time. Exemplarily, as shown in FIGS. 3, 66 to 87 represent lip feature points of the user, and in this embodiment of the present disclosure, some or all lip feature points in 66 to 87 can be extracted.

S302: Calculate a lip opening spacing and a lip thickness of the user according to distances between the plurality of lip feature points.

S303: Determine, if a ratio of the lip opening spacing to the lip thickness is not less than a first preset threshold, that a facial action of the user is a mouth opening action.

The first preset threshold may, for example, be ⅔.

S304: Perform image processing on the facial image of the user according to the mouth opening action of the user.

For example, a manner of performing image processing on a facial image may include:

Mapping is performed on the facial image by using a preset map corresponding to a facial action of the user. Alternatively, if a facial object corresponding to a facial action of the user is determined to be a mouth area in this embodiment of the present disclosure, corresponding special effect deformation processing is performed for the mouth area.

Figure 5:
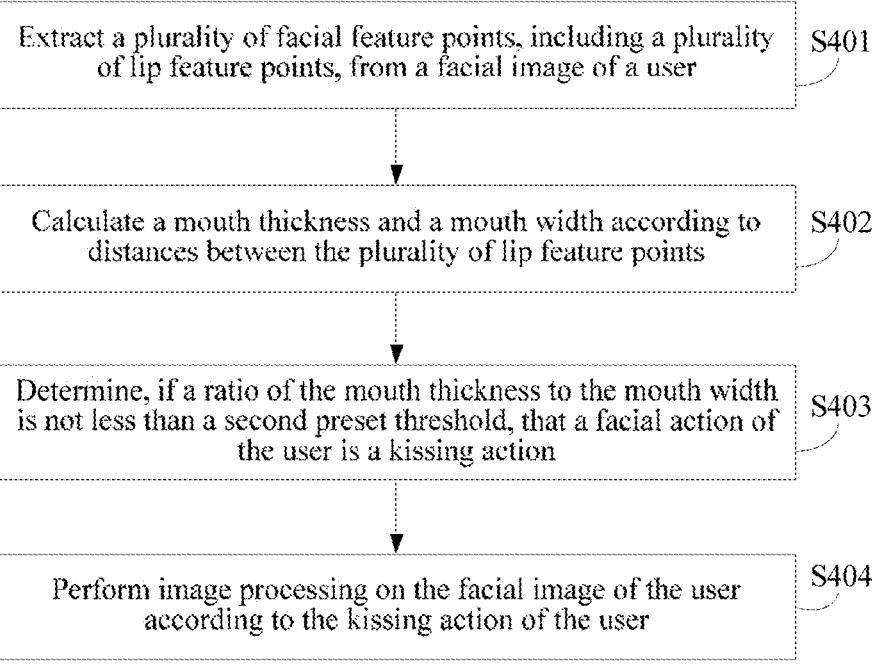
FIG. 5 is a schematic flowchart of a facial image processing method in another embodiment of the present disclosure.

FIG. 5 is a schematic flowchart of a facial image processing method in another embodiment of the present disclosure. As shown in FIG. 5, a procedure of the facial image processing method in this embodiment of the present disclosure includes the following.

S401: Extract a plurality of facial feature points, including a plurality of lip feature points, from a facial image of a user.

S402: Calculate a mouth thickness and a mouth width according to distances between the plurality of lip feature points.

S403: Determine, if a ratio of the mouth thickness to the mouth width is not less than a second preset threshold, that a facial action of the user is a kissing action.

The second preset threshold is less than 1, for example, is ½.

S404: Perform image processing on the facial image of the user according to the kissing action of the user.

For example, a manner of performing image processing on a facial image may include:

Mapping is performed on the facial image by using a preset map corresponding to a facial action of the user. Alternatively, if a facial object corresponding to a facial action of the user is determined to be a mouth area in this embodiment of the present disclosure, corresponding special effect deformation processing is performed for the mouth area.

Figure 6:
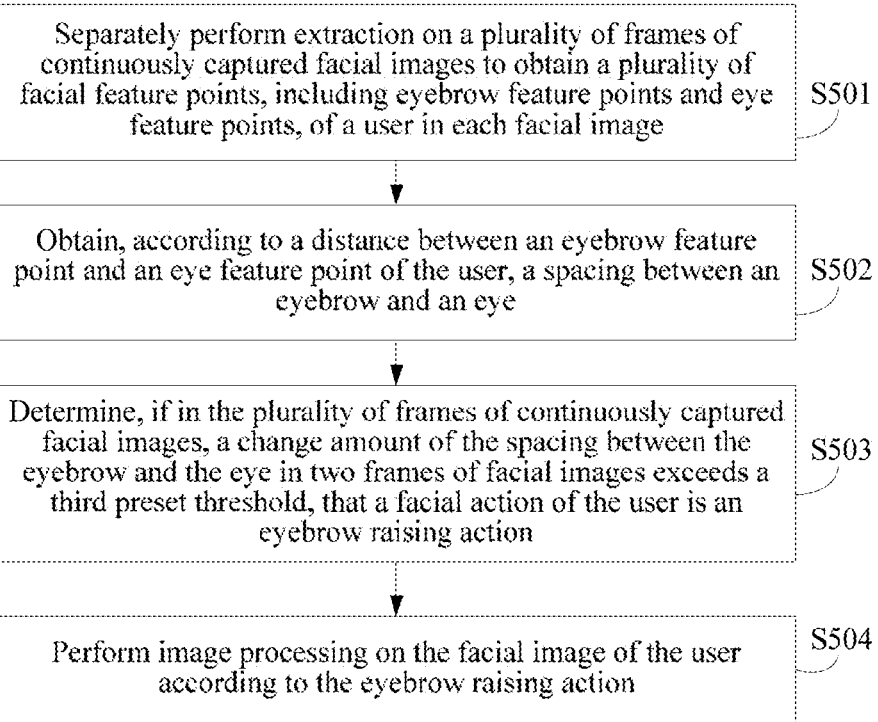
FIG. 6 is a schematic flowchart of a facial image processing method in another embodiment of the present disclosure.

FIG. 6 is a schematic flowchart of a facial image processing method in another embodiment of the present disclosure. As shown in FIG. 6, a procedure of the facial image processing method in this embodiment of the present disclosure includes the following.

S501: Separately perform extraction on a plurality of frames of continuously captured facial images to obtain a plurality of facial feature points, including eyebrow feature points and eye feature points, of a user in each facial image.

In this embodiment of the present disclosure, the facial image processing apparatus may obtain a plurality of frames of continuously captured facial images, and separately perform extraction on the plurality of the frames of continuously captured facial images, to obtain a plurality of facial feature points in each facial image. The plurality of frames of continuously captured facial images may be a plurality of frames of facial images continuously captured in a designated time length such as 1 second or 0.5 seconds.

Exemplarily, as shown in FIGS. 3, 21 to 28 and 29 to 36 respectively represent left eyebrow feature points and right eyebrow feature points of the user, 37 to 44 and 88 represent left eye feature points of the user, where 88 is a left eye pupil location, 45 to 51 and 89 represent right eye feature points of the user, where 89 is a right eye pupil location, and in this embodiment of the present disclosure, some or all feature points in 21 to 28, 37 to 44, and 88 can be extracted, or some or all feature points in 29 to 36, 45 to 51, and 89 can be extracted.

S502: Obtain, according to a distance between an eyebrow feature point and an eye feature point of the user, a spacing between an eyebrow and an eye.

In a first example of this embodiment of the present disclosure, as shown in FIG. 3, a distance between 23 and 39 can be used to present a spacing between an eyebrow and an eye of the user.

In a second example, a first eyebrow-eye spacing between an eyebrow tail position 21 of the user and a lower edge center position 39 of an eye on the same side can be obtained, and a second eyebrow-eye spacing between the eyebrow tail position 21 of the user and an outer eye corner position 37 on the same side can be obtained.

S503: Determine, if in the plurality of frames of continuously captured facial images, a change amount of the spacing between the eyebrow and the eye in two frames of facial images exceeds a third preset threshold, that a facial action of the user is an eyebrow raising action.

In the first example of this embodiment of the present disclosure, if in the plurality of frames of continuously captured facial images, a difference between ratios of a first eyebrow-eye spacing to a second eyebrow-eye spacing in two frames of facial images exceeds a third preset threshold (the third preset threshold herein, for example, may be 10 pixels), it is determined that a facial action of the user is a eyebrow raising action.

In the second example of this embodiment of the present disclosure, if in the plurality of frames of continuously captured facial images, a difference between ratios of a first eyebrow-eye spacing to a second eyebrow-eye spacing in two frames of facial images exceeds a third preset threshold (the third preset threshold herein, for example, may be 0.3 or 0.2), it is determined that a facial action of the user is a eyebrow raising action.

S504: Perform image processing on the facial image of the user according to the eyebrow raising action.

For example, a manner of performing image processing on a facial image may include:

Mapping is performed on the facial image by using a preset map corresponding to a facial action of the user. Alternatively, a facial object corresponding to a facial action of the user is determined to be an eyebrow area or an eye area in this embodiment of the present disclosure, corresponding special effect deformation processing is performed for the eyebrow area or the eye area.

Figure 7:
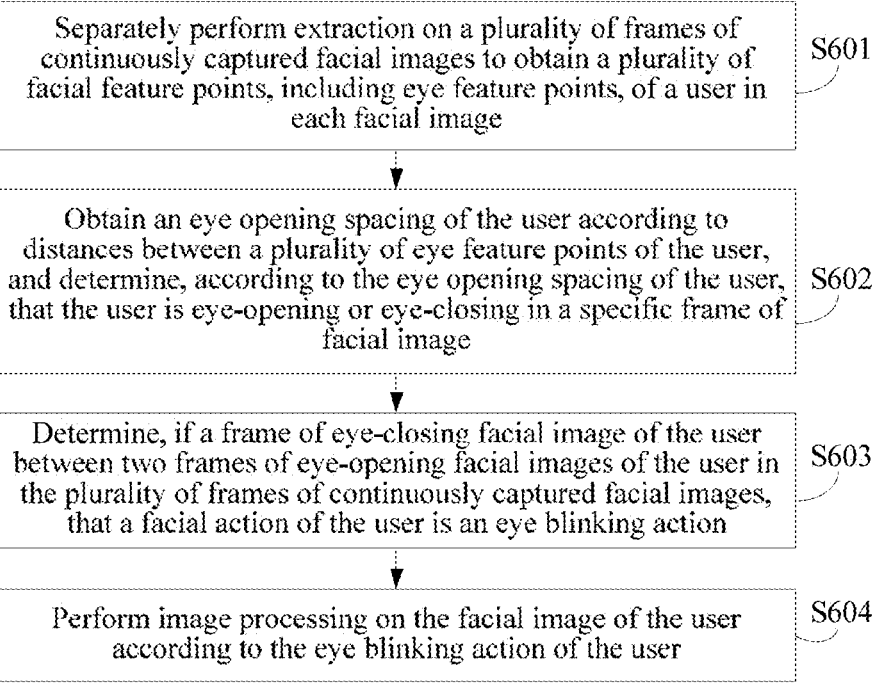
FIG. 7 is a schematic flowchart of a facial image processing method in another embodiment of the present disclosure.

FIG. 7 is a schematic flowchart of a facial image processing method in an embodiment of the present disclosure. As shown in FIG. 7, a procedure of the facial image processing method in this embodiment of the present disclosure includes the following.

S601: Separately perform extraction on a plurality of frames of continuously captured facial images to obtain a plurality of facial feature points, including eye feature points, of a user in each facial image.

Exemplarily, as shown in FIGS. 3, 37 to 44 and 88 represent left eye feature points of the user, where 88 is a left eye pupil location, 45 to 51 and 89 represent right eye feature points of the user, where 89 is a right eye pupil location, and in this embodiment of the present disclosure, some or all feature points in 37 to 44 and 88 can be extracted, or some or all feature points in 45 to 51 and 89 can be extracted.

S602: Obtain an eye opening spacing of the user according to distances between a plurality of eye feature points of the user, and determine, according to the eye opening spacing of the user, that the user is eye-opening or eye-closing in a specific frame of facial image.

For example, as shown in FIG. 3, a distance between 43 and 39 may be used as an eye opening spacing. If a distance between the eye 43 and 39 in a frame of facial image is greater than a preset spacing, for example, 5 pixels, it is determined that the eyes of the user are open. Otherwise, if the eye opening spacing is less than the preset spacing, it is determined that the eyes of the user are closed. In another example, the facial image processing apparatus may use a distance between an upper edge center location 43 of an eye of the user and a lower edge center location 39 as an eye opening spacing, additionally obtain a distance between the lower edge center location 39 of the eye of the user and an outer eye corner location 37 as an eye width, and if the eye opening spacing in a frame of facial image is greater than a half of the eye width, determine that the eyes of the user are open in the frame of facial image; otherwise, determine that the eyes of the user are closed in the frame of facial image.

S603: Determine, if a frame of eye-closing facial image of the user between two frames of eye-opening facial images of the user in the plurality of frames of continuously captured facial images, that a facial action of the user is an eye blinking action.

An eye blinking action is defined as that in a plurality of frames of continuously captured facial images, eye opening-eye closing-eye opening facial images sequentially appear. In another optional embodiment, it could be alternatively defined that two or more eye opening-eye closing changes are defined as an eye blinking action, so as to avoid responding to each time of eye blinking of the user.

S604: Perform image processing on the facial image of the user according to the eye blinking action of the user.

For example, a manner of performing image processing on a facial image may include:

Mapping is performed on the facial image by using a preset map corresponding to a facial action of the user. Alternatively, if a facial object corresponding to a facial action of the user is determined to be an eye area in this embodiment of the present disclosure, corresponding special effect deformation processing is performed for the eye area.

Figure 8:
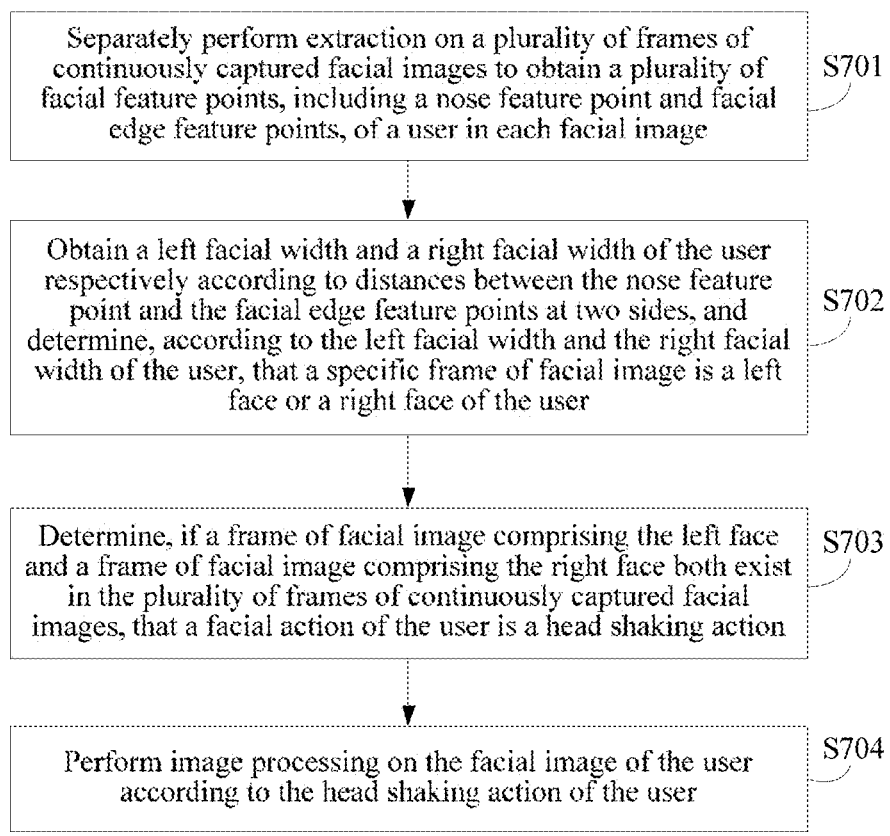
FIG. 8 is a schematic flowchart of a facial image processing method in another embodiment of the present disclosure.

FIG. 8 is a schematic flowchart of a facial image processing method in another embodiment of the present disclosure. As shown in FIG. 8, a procedure of the facial image processing method in this embodiment of the present disclosure includes the following.

S501: Separately perform extraction on a plurality of frames of continuously captured facial images to obtain a plurality of facial feature points, including a nose feature point and facial edge feature points, of a user in each facial image.

S702: Obtain a left facial width and a right facial width of the user respectively according to distances between the nose feature point and the facial edge feature points at two sides, and determine, according to the left facial width and the right facial width of the user, that a specific frame of facial image is a left face or a right face of the user.

S703: Determine, if a frame of facial image including the left face and a frame of facial image including the right face both exist in the plurality of frames of continuously captured facial images, that a facial action of the user is a head shaking action.

S704: Perform image processing on the facial image of the user according to the head shaking action of the user.

For example, a manner of performing image processing on a facial image may include:

Mapping is performed on the facial image by using a preset map corresponding to a facial action of the user. Alternatively, a facial object corresponding to a facial action of the user is determined to be a head area (as a whole) in this embodiment of the present disclosure, corresponding special effect deformation processing is performed for the head area.

Figure 12:
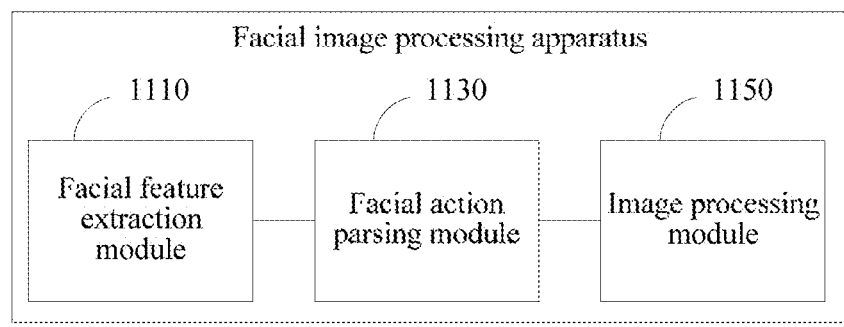
FIG. 12 is a schematic structural diagram of a facial image processing apparatus in an embodiment of the present disclosure.

FIG. 12 is a schematic structural diagram of a facial image processing apparatus in an embodiment of the present disclosure. As shown in FIG. 12, the facial image processing apparatus in this embodiment of the present disclosure may include the following.

A facial feature extraction module 1110 is configured to extract facial feature points corresponding to a facial organ from a facial image.

In an optional embodiment, the facial feature extraction module 1110 may capture a facial image of a user by using a camera module and perform facial feature extraction on the captured facial image in real time. In this embodiment of the present disclosure, the facial image processing apparatus may obtain a plurality of frames of continuously captured facial images, and separately perform extraction on the plurality of the frames of continuously captured facial images, to obtain a plurality of facial feature points in each facial image. The plurality of frames of continuously captured facial images may be a plurality of frames of facial images continuously captured in a designated time length such as 1 second or 0.5 seconds.

The facial feature point includes one or more of an eye feature point, a nose feature point, a lip feature point, an eyebrow feature point, and a facial edge feature point.

The facial action parsing module 1130 is configured to determine a facial action of a user according to distances between a plurality of facial feature points, involving the following processing: calculating distances between the facial feature points corresponding to the facial organ; calculating feature parameters of the facial organ at different positions according to the distances between the facial feature points; and determining, if the feature parameters satisfy a preset condition corresponding to a facial action, that the facial organ forms the facial action in the facial image.

In an optional embodiment, for recognizing a facial action from a frame of facial image, the facial action parsing module 1130 is specifically configured to calculate, according to distances between a plurality of feature points corresponding to the facial organ, feature parameters indicating sizes of the facial organ at different positions; and determine, if a ratio of a first feature parameter to a second feature parameter is not less than a preset threshold, that the facial image includes a facial action formed by the facial organ.

Figure 13:
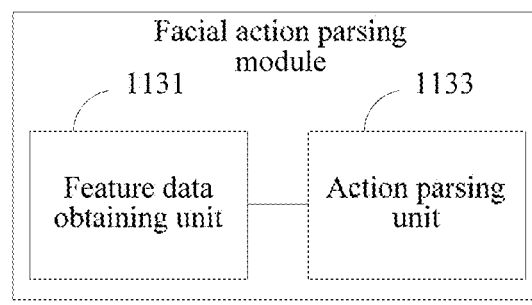
FIG. 13 is a schematic structural diagram of a facial action parsing module in an embodiment of the present disclosure.

For example, the facial action parsing module 1130, as shown in FIG. 13 may include the following.

A feature data obtaining unit 1131 is configured to extract distances between a plurality of facial features points of a facial organ from a facial image.

An action parsing unit 1133 is specifically configured to calculate, according to distances between a plurality of feature points corresponding to the facial organ, feature parameters indicating sizes of the facial organ at different positions. The facial action parsing module is specifically configured to determine, if a ratio of a first feature parameter to a second feature parameter is not less than a preset threshold, that the facial image includes a facial action formed by the facial organ.

For example, a preset condition corresponding to a mouth opening action can be defined as that: if a ratio of a lip opening spacing of the user to a lip thickness is not less than a first preset threshold, the feature data obtaining unit 1131 calculates a lip opening spacing and a lip thickness of the user according to distances between a plurality of lip feature points extracted from the facial image of a current user, and the action parsing unit 1133 determines, if a ratio of the lip opening spacing to the lip thickness is not less than a first preset threshold, a current facial action of the user is a mouth opening action. The first preset threshold may, for example, be ⅔. In an example where a lip opening spacing and a lip thickness are calculated, the feature data obtaining unit 1131 calculates a distance between a lower edge center of the upper lip and an upper edge center of the lower lip as the lip opening spacing, and calculates a distance, and calculates a distance between the upper edge center of the lower lip and a lower edge center as the thickness.

For another example, a preset condition corresponding to a kissing action may be defined as that: a ratio of a mouth thickness to a mouth width of a user is not less than a second preset threshold, where the second preset threshold is less than 1, for example, is ½. The feature data obtaining unit 1131 can obtain a mouth thickness and a mouth width of a user according distances between a plurality of lip feature points, and the action parsing unit 1133 determines whether a ratio of the mouth thickness to the mouth width is not less than a second preset threshold, and if yes, determines that a facial action of the user is a kissing action. The second preset threshold is less than 1, for example, is ½. In an example where a lip opening spacing and a lip thickness are calculated, the feature data obtaining unit 1131 calculates a distance between an upper edge center of the upper lip and a lower edge center of the lower lip as a mouth thickness and calculates a distance between the left mouth corner and the right mouth corner as a mouth width.

In an optional embodiment, for recognizing a facial action from a plurality of frames of facial images, the facial action parsing module 1130 is specifically configured to calculate, according to distances between a plurality of feature points corresponding to the facial organ, feature parameters indicating sizes of the facial organ at different positions; and determine, if a ratio of a first feature parameter to a second feature parameter is not less than a preset threshold, that the facial image includes a facial action formed by the facial organ.

For example, the feature data obtaining unit 1131 obtains each frame of facial image in a plurality of frames of continuously captured facial images and extracts a plurality of feature points of a facial organ from each of the frames of facial images. The action parsing unit 1133 determines features parameters according to distances between the plurality of facial feature points of the facial organ, where the feature parameters represent changes of positions of the facial organ between the plurality of frames of facial images, and determines, if changes of the positions of the facial organ between the plurality of frames of facial images satisfy a preset condition for a change when the facial organ forms a facial action, that the facial organ forms a facial action in the facial image.

For example, a preset condition corresponding to an eyebrow raising action may be defined as that: in a plurality of frames of continuously captured facial images, a change amount of the spacing between the eyebrow and the eye in two frames of facial images exceeds a third preset threshold. The feature data obtaining unit 1131 may obtain, according to a distance between an eyebrow feature point and an eye feature point of the user, a spacing between an eyebrow and an eye, and if in the plurality of frames of continuously captured facial images, a change amount of the spacing between the eyebrow and the eye in two frames of facial images exceeds a third preset threshold, the action parsing unit 1133 determines that a facial action of the user is an eyebrow raising action. The action parsing unit 1133 may determine whether the change amount exceeds the third preset threshold in the following manner: calculating a first eyebrow-eye spacing between an eyebrow tail and a lower edge center of an eye on the same side; calculating a second eyebrow-eye spacing between the eyebrow tail and an outer eye corner on the same side; and determining whether a difference between ratios of the first eyebrow-eye spacing to the second eyebrow-eye spacing in the plurality of frames of facial images exceeds a third preset threshold.

For another example, a preset condition corresponding to an eye blinking action may be defined as that: in a plurality of frames of continuously captured facial images, eye opening-eye closing-eye opening facial images sequentially appear. That is, there is a frame of eye closing facial image of the user between two frames of eye opening facial images of the user. The feature data obtaining unit 1131 can calculate an eye opening spacing of the user according to distances between a plurality of eye feature points of the user, and the action parsing unit 1133 determines that the user is eye-opening or eye-closing according to the eye opening spacing of the user in a specific frame of facial image. The action parsing unit 1133 determines, if a frame of eye-closing facial image of the user between two frames of eye-opening facial images of the user in the plurality of frames of continuously captured facial images, that a facial action of the user is an eye blinking action. In another optional embodiment, it could be alternatively defined that two or more eye opening-eye closing changes are defined as an eye blinking action, so as to avoid responding to each time of eye blinking of the user. In an example of determining that a facial image includes eye opening or eye closing, the action parsing unit 1133 is specifically configured to calculate a distance between upper and lower edge centers of an eye an eye opening spacing, calculate a distance between the lower edge center of the eye and an outer eye corner as an eye width, and if the eye opening spacing in the facial image is greater than a half of the eye width, determine that the plurality of frames of facial images includes eye opening; otherwise, determine the plurality of frames of facial images includes eye closing.

For another example, a preset condition corresponding to a head shaking action may be defined as that: in a plurality of frames of continuously captured facial images, there are a frame of facial image of a left face and a frame of facial image of a right face. The feature data obtaining unit 1131 may obtain a left facial width and a right facial width of the user according to a nose feature point and facial edge feature points of the user, and the action parsing unit 1133 determines, according to the left facial width and the right facial width of the user, that a specific frame of facial image is a left face or a right face of the user. In an example of determining whether a facial image includes a left face or a right face, the action parsing unit 1133 calculates a distance between the nasal tip and the facial left outer edge center as the left facial width; calculates a distance between the nasal tip and the facial right outer edge center as the right facial width; and determines, if a ratio of the left facial width to the right facial width in the facial image is less than a fourth preset threshold, that the facial image includes the right face, and determines, if the ratio is greater than the fourth preset threshold, that the facial image includes the left face, where the fourth preset threshold is less than 1.

It is pointed out that the above are merely examples. A person skilled in the art can obtain more instances without paying an inventive effort from the foregoing examples. For example, a nodding action, a frowning action, a face making action, a tongue wagging action, and the like of the user may be recognized. Exhaustion is not performed in the present disclosure.

An image processing module 1150 is configured to perform image processing on the facial image of the user according to the facial action of the user.

In a specific implementation, the facial image processing apparatus may preset image processing manners corresponding to various defined facial actions, and after obtaining a facial action of a user by facial image reorganization, the image processing module 1150 performs corresponding image processing on the facial image. For example, a manner in which the image processing module 1150 performs image processing on a facial image may include: 1) using a preset map corresponding to a facial action of a user to perform mapping on the facial image; and 2) determining a facial object corresponding to the facial action of the user, and performing corresponding special effect deformation processing for the facial object corresponding to the facial action of the user.

The embodiments of the present disclosure further provide a storage medium, storing an executable program, and when being executed by a processor, the executable program implementing the facial image processing method provided in the embodiments of the present disclosure, for example, the facial image processing method shown in any one of FIG. 2, FIG. 4, and FIG. 8. The storage medium includes a volatile random access memory (RAM), a read-only memory (ROM), an erasable programmable read only memory (EPROM), a flash memory or another memory technology, a compact disc read-only memory (CD-ROM), a digital versatile disc (DVD), or another accessed medium.

In this embodiment of the present disclosure, a facial action of a user in a facial image is determined by calculating distances between a plurality of facial feature points recognized from the facial image, and image processing is performed on the facial image according to the facial action of the user, so as to perform dynamic processing on the facial image according to different facial actions or expressions of the user.

What is disclosed above is merely an example of the embodiments of the present disclosure, and certainly is not intended to limit the protection scope of the present disclosure. Therefore, equivalent variations made in accordance with the claims of the present disclosure shall fall within the scope of the present disclosure.

What is claimed is:

1. A method for image processing, comprising:
    extracting, by processing circuitry, from a first image of a face, first values of feature points of a facial organ of a plurality of facial organs on the face, the feature points of the facial organ being indicative of characteristics of the facial organ;
    calculating first distances between the feature points of the facial organ based on the first values of the feature points;
    calculating size parameters at multiple positions of the facial organ according to the first distances between the feature points;
    calculating a ratio of a first size parameter of the size parameters to a second size parameter of the size parameters;
    comparing the ratio to a preset threshold associated with a facial action of the facial organ to detect the facial action; and
    detecting the facial action of the facial organ on the face when the ratio satisfies a preset condition associated with the facial action.

2. The method according to claim 1, wherein
    the feature points comprise a plurality of lip feature points of an upper lip and a lower lip on the face;
    the calculating the size parameters includes calculating a lip opening between the upper lip and the lower lip, and a lip thickness according to distances between the lip feature points; and the calculating the ratio includes calculating a ratio of the lip opening to the lip thickness; and the comparing includes comparing the ratio to the preset threshold associated with a lip opening action to detect the lip opening action.

3. The method according to claim 2, wherein the plurality of lip feature points comprises a first center point of a bottom edge of the upper lip on the face, a second center point of a top edge of the lower lip, and a third center point of a bottom edge of the lower lip;

the calculating the lip opening includes calculating the lip opening according to a distance between the first center point and the second center point; and the calculating the lip thickness includes calculating the lip thickness according to a distance between the second center point and the third center point.

4. The method according to claim 1, wherein the feature points comprise a plurality of lip feature points of an upper lip and a lower lip of a mouth on the face;

the calculating the size parameters includes calculating a mouth thickness and a mouth width according to distances between the lip feature points;

the calculating the ratio includes calculating a ratio of the mouth thickness to the mouth width; and the comparing includes comparing the ratio to the preset threshold associated with a kiss action to detect the kiss action.

5. The method according to claim 4, wherein the plurality of lip feature points comprises a left corner point of the mouth, a right corner point of the mouth, a first center point of a top edge of the upper lip, and a second center point of a bottom edge of the lower lip;

the calculating the mouth thickness includes calculating the mouth thickness according to a distance between the first center point and the second center point;

the calculating the mouth width includes calculating the mouth width according to a distance between the left corner point and the right corner point.

6. The method according to claim 1, further comprising at least one of:

adding a map in association with the facial action to a top layer of the first image; and performing a special effect deformation processing in association with the facial action for the facial organ.

7. A method for image processing, comprising:

extracting, by processing circuitry, from a first image of a face, first values of feature points of a facial organ of a plurality of facial organs on the face, the feature points of the facial organ being indicative of characteristics of the facial organ;

calculating first distances between the feature points of the facial organ based on the first values of the feature points;

extracting, from a second image of the face, second values of the feature points of the facial organ on the face;

calculating second distances between the feature points of the facial organ based on the second values of the feature points;

calculating feature parameters of the facial organ according to changes from the first distances to the second distances; and detecting a facial action of the facial organ on the face when the feature parameters satisfy a preset condition associated with the facial action.

8. The method according to claim 7, wherein the feature points comprise eyebrow feature points and eye feature points;

the calculating the first distances includes calculating a first eyebrow-eye distance between an eyebrow feature point and an eye feature point in the first image;

the calculating the second distances includes calculating a second eyebrow-eye distance between the eyebrow feature point and the eye feature point in the second image;

the calculating the feature parameters includes calculating a change based on the first eyebrow-eye distance to the second eyebrow-eye distance; and the detecting includes comparing the change to a preset threshold associated with an eyebrow raising action to detect the eyebrow raising action from the first image to the second image.

9. The method according to claim 8, wherein the calculating the first distances includes calculating a first center distance between eyes and eyebrows and a first outer distance between the eyes and the eyebrows in the first image;

the calculating the second distances includes calculating a second center distance between the eyes and eyebrows and a second outer distance between the eyes and the eyebrows in the second image; and the calculating the change includes calculating a first ratio of the first center distance to the first outer distance, calculating a second ratio of the second center distance to the second outer distance, and calculating the change as a difference between the first ratio to the second ratio.

10. The method according to claim 7, wherein the feature points comprise eye feature points, and the method comprises:

detecting respective open/close status of an eye in a plurality of images according to values of the eye feature points that are extracted from respective images; and determining an eye blinking action associated with a change pattern of the open/close status of the eye in the plurality of images.

11. The method according to claim 10, wherein the plurality of eye feature points comprises center points of an eye and outer points of the eye, and the method comprises;

calculating an eye open of the eye based on the center points of the eye;

calculating an eye width of the eye based on the outer points of the eye;

calculating a ratio of the eye open to the eye width; and detecting the open/close status of the eye based on the ratio.

12. The method according to claim 7, wherein the feature points comprise a nose feature point and face edge feature points, and the method comprises:

detecting respective orientation of the face in a plurality of images according to values of the nose feature point and the face edge feature points that are extracted from respective images; and determining a head shaking action associated with a change pattern of the orientation of the face in the plurality of images.

13. The method according to claim 12, wherein the nose feature point comprises a nasal tip point, the face edge feature points comprise a left outer edge center point and a right outer edge center point, and the method comprises:

calculating a left face width based on the nasal tip point and the left outer edge center point;

calculating a right face width based on the nasal tip point and the right outer edge center point;

calculating a ratio of the left face width to the right face width; and detecting the orientation of the face based on the ratio.

14. The method according to claim 7, wherein the first image and the second image are among a plurality of images that is taken consecutively in a time duration.

15. The method according to claim 7, further comprising at least one of:

adding a map in association with the facial action to a top layer of the first image; and performing a special effect deformation processing in association with the facial action for the facial organ.

16. An apparatus, comprising:

processing circuitry configured to:

extract, from a first image of a face, first values of feature points of a facial organ of a plurality of facial organs on the face, the feature points of the facial organ being indicative of characteristics of the facial organ;

calculate first distances between the feature points of the facial organ based on the first values of the feature points;

calculate size parameters at multiple positions of the facial organ according to the first distances between the feature points; and calculate a ratio of a first size parameter of the size parameters to a second size parameter of the size parameters; and compare the ratio to a preset threshold associated with a facial action of the facial organ to detect the facial action; and detect the facial action of the facial organ on the face when the ratio satisfies a preset condition associated with the facial action.

17. An apparatus, comprising:

processing circuitry configured to:

extract, from a first image of a face, first values of feature points of a facial organ of a plurality of facial organs on the face, the feature points of the facial organ being indicative of characteristics of the facial organ;

calculate first distances between the feature points of the facial organ based on the first values of the feature points;

extract, from a second image of the face, second values of the feature points of the facial organ on the face;

calculate second distances between the feature points of the facial organ based on the second values of the feature points;

calculate feature parameters of the facial organ according to changes from the first distances to the second distances; and detect a facial action of the facial organ on the face when the feature parameters satisfy a preset condition associated with the facial action.

18. The apparatus according to claim 17, wherein the processing circuitry is configured to perform at least one of:

adding a map in association with the facial action to a top layer of the first image; and performing a special effect deformation processing in association with the facial action for the facial organ.

19. A non-transitory computer-readable medium storing instructions which when executed by a computer cause the computer to perform:

extracting from a first image of a face, first values of feature points of a facial organ of a plurality of facial organs on the face, the feature points of the facial organ being indicative of characteristics of the facial organ;

calculating first distances between the feature points of the facial organ based on the first values of the feature points;

calculating size parameters at multiple positions of the facial organ according to the first distances between the feature points;

calculating a ratio of a first size parameter of the size parameters to a second size parameter of the size parameters;

comparing the ratio to a preset threshold associated with a facial action of the facial organ to detect the facial action; and detecting the facial action of the facial organ on the face when the ratio satisfies a preset condition associated with the facial action.

20. A non-transitory computer-readable medium storing instructions which when executed by a computer cause the computer to perform:

extracting from a first image of a face, first values of feature points of a facial organ of a plurality of facial organs on the face, the feature points of the facial organ being indicative of characteristics of the facial organ;

calculating first distances between the feature points of the facial organ based on the first values of the feature points;

extracting, from a second image of the face, second values of the feature points of the facial organ on the face;

calculating second distances between the feature points of the facial organ based on the second values of the feature points;

calculating feature parameters of the facial organ according to changes from the first distances to the second distances; and detecting a facial action of the facial organ on the face when the feature parameters satisfy a preset condition associated with the facial action.

* * * * *